No. 607,695. Patented July 19, 1898.
A. C. MOORE & G. RODWELL.
ELASTIC TIRE AND RIM FOR WHEELS.
(Application filed Dec. 21, 1897.)
(No Model.)
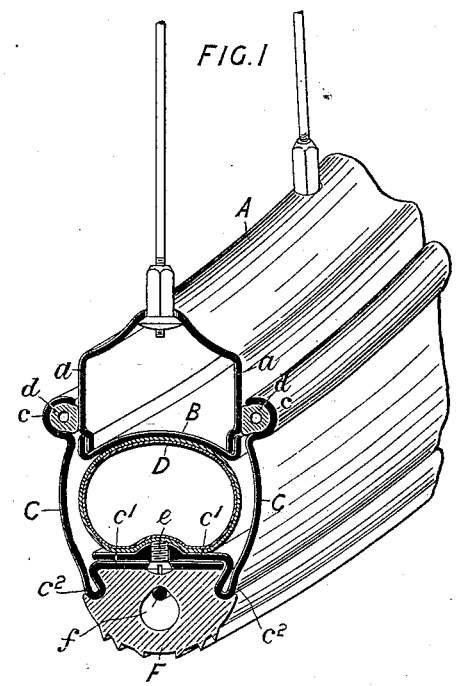
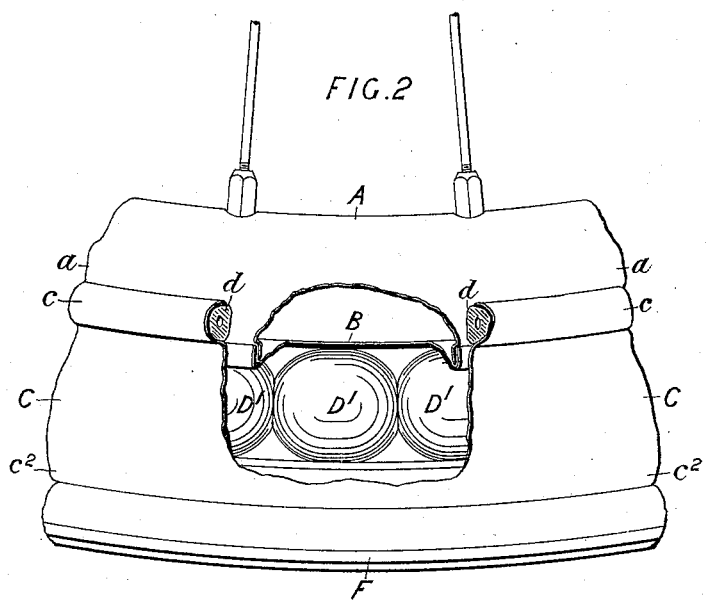
Witnesses.
Inventors,
A. C. Moore,
G. Rodwell,
By
Attorneys.
THE NORRIS PETERS CO., PHOTO-LITHO., WASHINGTON, D. C.

UNITED STATES PATENT OFFICE.

ARTHUR C. MOORE AND GEORGE RODWELL, OF LONDON, ENGLAND.

ELASTIC TIRE AND RIM FOR WHEELS.

SPECIFICATION forming part of Letters Patent No. 607,695, dated July 19, 1898.

Application filed December 21, 1897. Serial No. 662,880. (No model.)

*To all whom it may concern:*

Be it known that we, ARTHUR CHARLES MOORE, manager of Frederick Braby & Co., Limited, Deptford, London, S. E., and GEORGE RODWELL, fitter, of 58 Stanhope street, Euston road, London, N. W., England, have invented new and useful Improvements in Elastic Tires and Rims for Wheels, of which the following is a full, clear, and exact description.

Our invention relates to an improved elastic rim for wheels possessing in an eminent degree the qualities of lightness, elasticity, and strength; and it consists, essentially, in the combination, with a jointless inner rim of approximately U-section with outwardly-directed flanges, of an outer rim or member constructed of two annular members, together forming an outer annular member of approximately U-section, with inwardly-directed flanges adapted to embrace the sides or flanges of the inner rim, and of an intervening pneumatically-inflated rubber chamber or chambers whereby the required resiliency is obtained without liability of puncturing, the air chamber or chambers being wholly inclosed and protected by the outer member of the metallic rim.

The invention is illustrated in the accompanying drawings, forming part of this specification, wherein we have represented, in—

Figure 1, a cross-section of the improved elastic rim, and in Fig. 2, a side view, partly in section, showing the use of a number of separate air-chambers.

The wheel-rim is composed of an inner annular member A B, preferably of aluminium, the part A, to which the spokes are attached in the usual way, being preferably jointless and spun up to an approximately U-section, its sides $a\ a$ being parallel and outwardly directed from the axis of the wheel. The space between these sides is bridged over by an intermediate annular member B, also of aluminium, of curved cross-section adapted to brace the flanges $a$ together and form by its externally-concave surface a seat for the pneumatic chamber or chambers. This intermediate annular member B may either form an integral part of the inner member A or be made separately and have its edges spun over or otherwise so formed as to embrace the edges of the flanges $a$, as shown, this member being either made jointless or having its ends joined up by riveting to a joint-covering piece at back and being in either case an integral part of the inner rim A for the purposes of this invention.

The outer annular member C is also preferably of aluminium spun up to an approximately U-section, the side flanges being inwardly directed and formed with hollow beaded edges $c$, adapted to receive packings of rubber tubing $d$, held in place by cement, between which fit the side flanges $a$ of the inner member A, so as to make a sufficiently tight joint to exclude wet and dust, while permitting relative motion of the outer member C on the inner member A in the radial direction of the wheel. This outer member C is, however, made of two jointless annular members, each comprising one side flange and a transverse or peripheral portion, the peripheral portions $c'\ c'$ overlapping each other and being united by screw-bolts and nuts $e$ after being applied in position around the inner member A and pneumatic chamber D. The outer member C is spun of such a beaded form in cross-section at $c^2$ as to form, with the transverse peripheral portions $c'$, a dovetail grooved seat to receive a solid or cushion rubber tire tread F of suitable section, sprung into place and secured either by cement or preferably by a binding-wire $f$, passed through the hollow of the rubber cushion and secured by its ends being led through holes into the interior of the member C and secured by any suitable means.

The pneumatic chamber (or chambers) D is confined within the hollow of the outer member C and between it and its seat in the grooved part B of the inner member A. It may be an endless tube of rubber provided with the usual connection and valve and would preferably be enveloped in canvas or have canvas embedded in it to limit its dilatation under internal air-pressure, or it may consist of a sufficient number of inflated india-rubber balls D', such as are sold for toys, packed tightly between the inner and outer members of the rim and either in close juxtaposition, as shown, or spaced at intervals apart and there maintained either by cup-like depressions in the seat B or by other suitable means, so as, while pneumatically separate, to form a practically continuous or nearly continuous air-cushion between the outer member C and the inner member A B of the rim.

Any or all of the members A, B, and C instead of being formed as above described may be brought to the desired shape by rolling and may be composed of one or more lengths or sections, the joints being secured in any suitable manner. It will be obvious that if the member C be made in two or more sections each such section may be complete in itself instead of being composed of two overlapping halves, as shown in the drawings.

We claim—

1. An elastic rim for wheels, constructed of an inner annular member having parallel sides, an outer annular member of approximately U-section whose sides or flanges are formed with hollow beaded edges, and rubber packings fitting within the hollow beaded edges and adapted to embrace and fit against the sides of the inner member, so as to make a dust and wet tight joint therewith, while permitting of relative motion in the radial direction, and of a pneumatically-inflated chamber or chambers interposed between the inner and outer annular members, substantially as and for the purpose specified.

2. An elastic rim for wheels, constructed of an inner annular member made jointless and of approximately U-section with parallel outwardly-directed side flanges, a concavely-grooved annular member embracing the edges of the said flanges so as to brace them and form a practically integral part of the inner member, an outer annular member of approximately U-section having inwardly-directed flanges adapted to embrace the inner member with freedom for relative radial motion, the outer member being made of two jointless annular semimembers united as described, and a pneumatically-inflated chamber or chambers interposed between the inner and outer annular members substantially as described.

3. An elastic rim for wheels, constructed of an inner annular member made jointless and of approximately U-section with parallel outwardly-directed side flanges, a concavely-grooved annular member embracing the edges of the said flanges so as to brace them and form a practically integral part of the inner member, an outer annular member of approximately U-section having inwardly-directed flanges adapted to embrace the inner member with freedom for relative radial motion, the outer member being made of two jointless annular semimembers united as described, and so shaped as to form a peripheral grooved seat for a rubber tread, a solid or cushion rubber tread fitted in such groove, and a pneumatically-inflated chamber or chambers interposed between the inner and outer annular members substantially as described.

4. An elastic rim for wheels, comprising an inner annular member having parallel outwardly-directed side flanges, connected at their edges by an annular portion having its external surface concave, an outer annular member comprising a transverse peripheral portion and inwardly-directed side flanges, each side flange being formed with a hollow beaded edge adapted to receive a rubber packing, the side flanges of the inner member fitting between the said packings and a pneumatically-inflated chamber or chambers interposed between the inner and outer annular members, substantially as described.

5. An elastic rim for wheels consisting of an inner annular member approximately U-shaped in cross-section and having parallel outwardly-directed side flanges, an annular member bridging the space between the side flanges of the inner annular member thereof, the said member being concave on its outer face and having side flanges embracing the edges of the side flanges of the said inner annular member, an outer annular member approximately U-shaped in cross-section, the said member having inwardly-directed flanges formed with hollow beaded edges adapted to receive a rubber packing for engagement with the side flanges of the inner member, the said outer member comprising two annular parts, each having one side flange and a transverse or peripheral portion, the said peripheral portions being adapted to overlap each other, the side flanges of the said outer member extending below the peripheral portion and forming therewith a dovetailed grooved seat, a rubber tread fitted in said seat and a pneumatically-inflated chamber or chambers interposed between the concave face of the inner annular member and the peripheral portion of the outer annular member, substantially as described.

ARTHUR C. MOORE.
GEORGE RODWELL.

In presence of—
T. W. KENNARD,
W. N. HOLMES.